US012394428B2

(12) United States Patent
Tu et al.

(10) Patent No.: US 12,394,428 B2
(45) Date of Patent: Aug. 19, 2025

(54) AUDIO SIGNAL PROCESSING METHOD AND MOBILE APPARATUS

(71) Applicant: Acer Incorporated, New Taipei (TW)

(72) Inventors: Po-Jen Tu, New Taipei (TW); Jia-Ren Chang, New Taipei (TW); Kai-Meng Tzeng, New Taipei (TW)

(73) Assignee: Acer Incorporated, New Taipei (TW)

( * ) Notice: Subject to any disclaimer, the term of this patent is extended or adjusted under 35 U.S.C. 154(b) by 313 days.

(21) Appl. No.: 18/308,680

(22) Filed: Apr. 28, 2023

(65) Prior Publication Data

US 2024/0203441 A1 Jun. 20, 2024

(30) Foreign Application Priority Data

Dec. 16, 2022 (TW) ................................ 111148595

(51) Int. Cl.

| | |
|---|---|
| ***G10L 21/0308*** | (2013.01) |
| ***G10L 25/06*** | (2013.01) |
| ***H04R 1/02*** | (2006.01) |
| ***H04R 1/40*** | (2006.01) |
| ***H04R 3/00*** | (2006.01) |

(52) U.S. Cl.

CPC .......... *G10L 21/0308* (2013.01); *G10L 25/06* (2013.01); *H04R 1/028* (2013.01); *H04R 1/406* (2013.01); *H04R 3/005* (2013.01); *H04R 2499/15* (2013.01)

(58) Field of Classification Search

None

See application file for complete search history.

(56) References Cited

U.S. PATENT DOCUMENTS

| | | | | |
|---|---|---|---|---|
| 10,535,362 | B2 * | 1/2020 | Bryan | G10L 21/0364 |
| 2009/0129609 | A1 | 5/2009 | Oh et al. | |
| 2009/0164212 | A1 * | 6/2009 | Chan | G10L 21/0208 704/226 |
| 2020/0051564 | A1 | 2/2020 | Chae et al. | |
| 2022/0335934 | A1 * | 10/2022 | Khamis | H04R 3/005 |

FOREIGN PATENT DOCUMENTS

| | | |
|---|---|---|
| CN | 114449393 | 5/2022 |
| CN | 115223594 | 10/2022 |
| TW | 200629236 | 8/2006 |
| TW | 200939210 | 9/2009 |

* cited by examiner

*Primary Examiner* — Paul W Huber

(74) *Attorney, Agent, or Firm* — JCIPRNET

(57) ABSTRACT

An audio signal processing method and a mobile apparatus are provided. In the method, a target direction in multiple sound-reception directions and a target distance corresponding to the target direction is determined according to multiple first audio signals in the sound-reception directions received by an embedded microphone. A target algorithm is selected from multiple blind signal separation (BSS) algorithms according to the target direction and the target distance. The first audio signal received by the embedded microphone at the target direction is set as a secondary signal of the target algorithm, and the second audio signal received by an external microphone is set as a primary signal of the target algorithm. The audio signal of the primary sound source is separated from the primary signal and the secondary signal through the target algorithm. Accordingly, the microphone path merely outputs a single audio signal of the primary sound source.

15 Claims, 6 Drawing Sheets

AUDIO SIGNAL PROCESSING METHOD AND MOBILE APPARATUS

CROSS-REFERENCE TO RELATED APPLICATION

This application claims the priority benefit of Taiwan application serial no. 111148595, filed on Dec. 16, 2022. The entirety of the above-mentioned patent application is hereby incorporated by reference herein and made a part of this specification.

BACKGROUND

Technical Field

The disclosure relates to a signal processing technique, and in particular relates to an audio signal processing method and a mobile apparatus.

Description of Related Art

Generally, there are some noise reduction mechanisms on the transmission path of the microphone for conference applications in notebook computers. For example, the steady-state noise reduction technology of a single microphone, or the beamforming technology of a microphone array adjusts the direction of beam sound-reception direction (in order to avoid the direction of user movement, the angle of the beam should not be too narrow). Even the back-end artificial intelligence (AI) noise reduction technology is used to preserve the human voice signal.

For example, FIG. 1A and FIG. 1B are schematic diagrams of an example illustrating a three-dimensional microphone array based on AI noise reduction processing. Referring to FIG. 1A and FIG. 1B which are notebook computers with two and three microphones (mic) respectively. By adding a microphone (mic), the directivity of the beam can be increased, facilitating the reduction of the audio signal of other people.

In practical applications, when there are other people talking near the user, the voice signals of other people are often not filtered out, and even follow the voice signal of the user and are transferred out through the microphone path. In addition, when the user moves and is not completely in the direction corresponding to the microphone array, the received audio signal is also affected.

On the other hand, in a conference, most users uses an external microphone (e.g., a headset microphone). However, some external microphones are omnidirectional, which causes the surrounding audio signals to be recorded, which affects the noise reduction effect.

SUMMARY

In view of this, the embodiments of the disclosure provide an audio signal processing method and a mobile apparatus, which use a blind signal separation (BSS) technology to enhance the noise reduction effect.

The audio signal processing method of the embodiment of the disclosure is suitable for a mobile apparatus and an external microphone (mic), the mobile apparatus is communicatively connected to the external microphone, and the mobile apparatus includes an embedded microphone (mic). This audio signal processing method includes (but not limited to) the following operation. A target direction of multiple sound-reception directions and a target distance corresponding to the target direction is determined according to multiple first audio signals in the sound-reception directions received by the embedded microphone. A primary sound source is located in the target direction and at the target distance from the embedded microphone, the target direction is determined based on a correlation between the first audio signals and a second audio signal received by the external microphone, and the target distance is determined based on signal power of a first audio signal in the target direction. A target algorithm is selected from multiple blind signal separation (BSS) algorithms according to the target direction and the target distance. The target algorithm is determined based on an included angle between the target direction and the interference source sound direction and the magnitude of the target distance, and the interference source sound direction corresponds to an interference sound source. The first audio signal received by the embedded microphone at the target direction is set as a secondary signal of the target algorithm, and the second audio signal received by an external microphone is set as a primary signal of the target algorithm. The audio signal of the primary sound source is separated from the primary signal and the secondary signal through the target algorithm.

The mobile apparatus of the embodiment of the disclosure includes (but is not limited to) an embedded microphone, a communication transceiver, and a processor. The embedded microphone is used for sound reception. The communication transceiver is communicatively connected to an external microphone and used to receive signals from the external microphone. The processor is coupled to the embedded microphone and the communication transceiver. The processor is configured to perform the following operation. A target direction of multiple sound-reception directions and a target distance corresponding to the target direction is determined according to multiple first audio signals in the sound-reception directions received by the embedded microphone. A target algorithm is selected from multiple blind signal separation (BSS) algorithms according to the target direction and the target distance. The first audio signal received by the embedded microphone at the target direction is set as a secondary signal of the target algorithm, and the second audio signal received by an external microphone is set as a primary signal of the target algorithm. The audio signal of the primary sound source is separated from the primary signal and the secondary signal through the target algorithm. A primary sound source is located in the target direction and at the target distance from the embedded microphone, the target direction is determined based on a correlation between the first audio signals and the second audio signal received by the external microphone, and the target distance is determined based on signal power of a first audio signal in the target direction. The target algorithm is determined based on an included angle between the target direction and the interference source sound direction and the magnitude of the target distance, and the interference source sound direction corresponds to an interference sound source.

Based on the above, according to the audio signal processing method and the mobile apparatus according to the embodiments of the disclosure, the audio signal of the primary sound source can be separated from the mixed signal (e.g., the first audio signal and the second audio signal) by using the corresponding target algorithm according to the location of the primary sound source. In this way, when the user uses the external microphone, only a single human vocal signal of the primary user can be transmitted from the microphone path.

In order to make the above-mentioned features and advantages of the disclosure comprehensible, embodiments accompanied with drawings are described in detail below.

DETAILED DESCRIPTION OF DISCLOSED EMBODIMENTS

Figure 1A:
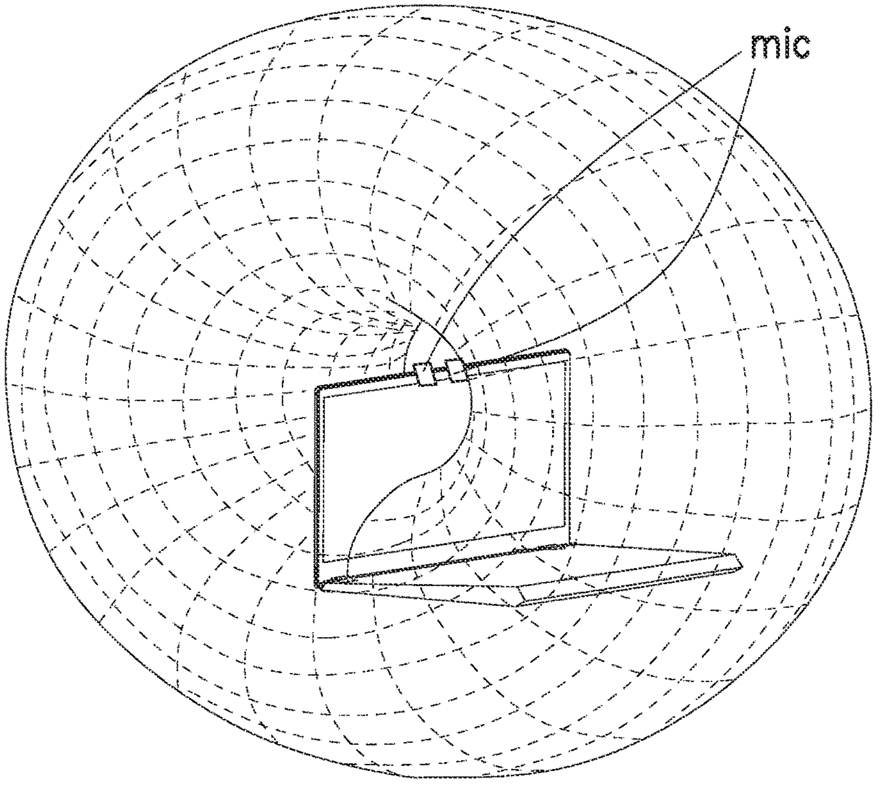
FIG. 1A and FIG. 1B are schematic diagrams of an example illustrating a three-dimensional microphone array based on AI noise reduction processing.
Figure 1B:
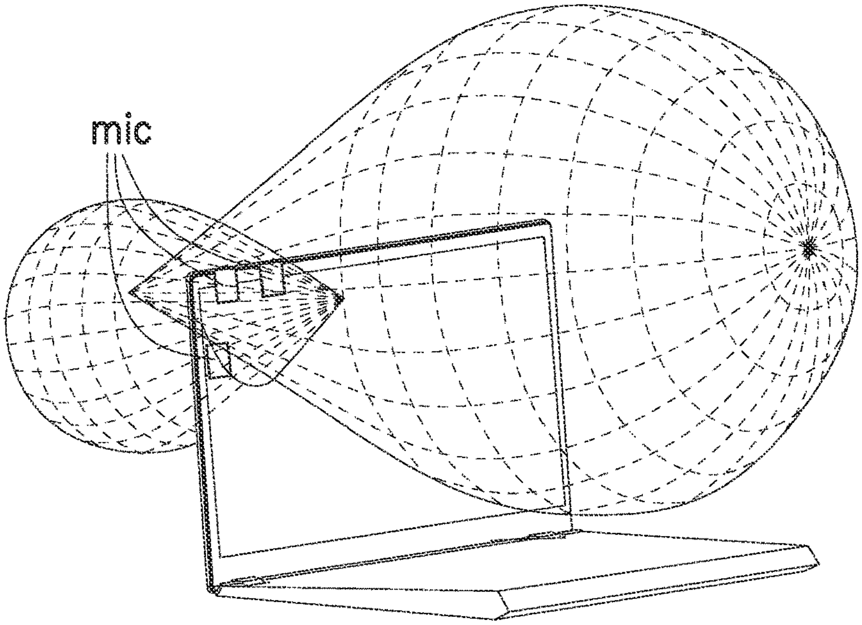
Figure 2:
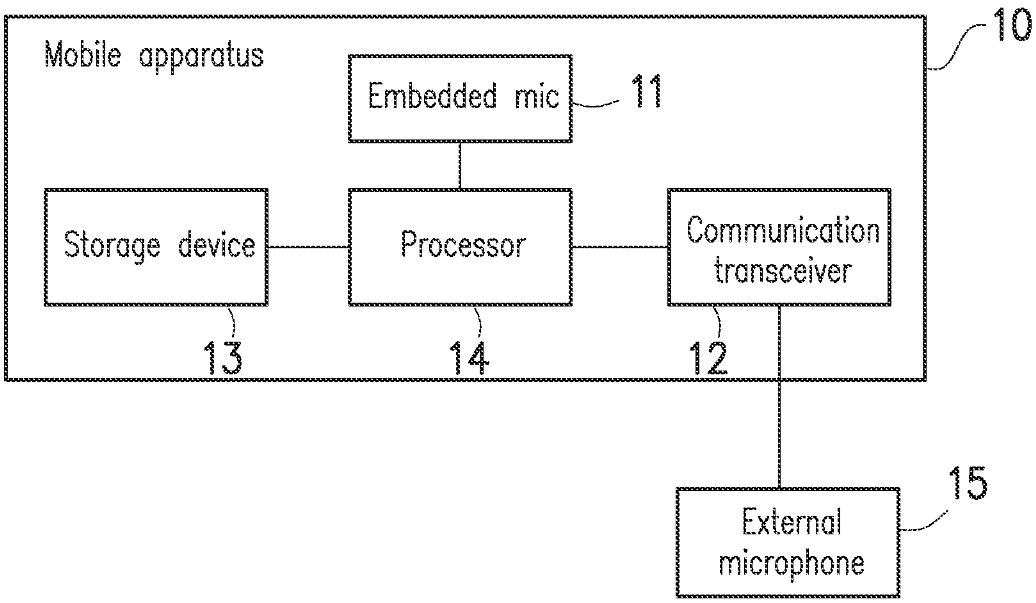
FIG. 2 is a block diagram of elements of a mobile apparatus and an external microphone according to an embodiment of the disclosure.

FIG. 2 is a block diagram of elements of a mobile apparatus 10 and an external microphone 15 according to an embodiment of the disclosure. Referring to FIG. 2, the mobile apparatus 10 includes (but not limited to) an embedded microphone (mic) 11, a communication transceiver 12, a storage device 13, and a processor 14. The mobile apparatus 10 may be a notebook computer, a smart phone, a tablet computer, a desktop computer, a smart TV, a smart speaker, an intelligent assistant, a car system, or other electronic apparatuses.

The embedded microphone 11 can be a type of microphone, such as dynamic, condenser, or electret condenser, etc., and the embedded microphone 11 may also be a combination of other electronic elements, analog-to-digital converters, filters, and audio processors capable of receiving sound waves (e.g., human voice, ambient sound, machine operation sound, etc.) (i.e., sound reception or sound recording) and converting them into audio signals. The embedded microphone 11 is combined with the body of the mobile apparatus 10. In one embodiment, two or more embedded microphones 11 form a microphone array to provide a directional beam. In one embodiment, the embedded microphone 11 is used to receive/record the human speaker to obtain the voice signal. In some embodiments, the voice signal may include the voice of the human speaker, the sound from a speaker apparatus (not shown) and/or other ambient sounds.

The communication transceiver 12 can support Bluetooth, universal serial bus (USB), optical fiber, S/PDIF, 3.5 mm, or other audio transmission interfaces. In one embodiment, the communication transceiver 12 is used to receive (audio) signals from the external microphone 15.

The storage device 13 may be any type of fixed or movable random access memory (RAM), read only memory (ROM), flash memory, conventional hard disk drive (HDD), solid-state drive (SSD) or similar components. In one embodiment, the storage device 13 is used to store program codes, software modules, configuration, data (e.g., audio signals, algorithm parameters, etc.) or files, and the embodiments thereof are described in detail below.

The processor 14 is coupled to the embedded microphone 11, the communication transceiver 12, and the storage device 13. The processor 14 may be a central processing unit (CPU), a graphics processing unit (GPU), or other programmable general-purpose or special-purpose microprocessors, a digital signal processor (DSP), a programmable controller, a field programmable gate array (FPGA), an application-specific integrated circuit (ASIC), a neural network accelerator, or other similar components, or combinations of components thereof. In one embodiment, the processor 14 is used to execute all or some of the operations of the mobile apparatus 10, and can load and execute various program codes, software modules, files, and data stored in the storage device 13. In some embodiments, the functions of the processor 14 can be realized by software or chips.

The external microphone 15 can be a type of microphone, such as dynamic, condenser, or electret condenser, etc., and the external microphone 15 may also be a combination of other electronic elements, analog-to-digital converters, filters, and audio processors capable of receiving sound waves (e.g., human voice, ambient sound, machine operation sound, etc.) (i.e., sound reception or sound recording) and converting them into audio signals. The external microphone 15 can be omnidirectional or directional. In one embodiment, the external microphone 15 is an earphone microphone or a microphone of a wearable device. In one embodiment, the external microphone 15 is used to receive/record the human speaker to obtain the voice signal. In some embodiments, the voice signal may include the voice of the human speaker, the sound from a speaker apparatus (not shown) and/or other ambient sounds.

Hereinafter, the method according to the embodiment of the disclosure is described in conjunction with various components and modules in the mobile apparatus 10 and the external microphone 15. Each process of the method can be adjusted according to the implementation, and is not limited to thereto.

Figure 3:
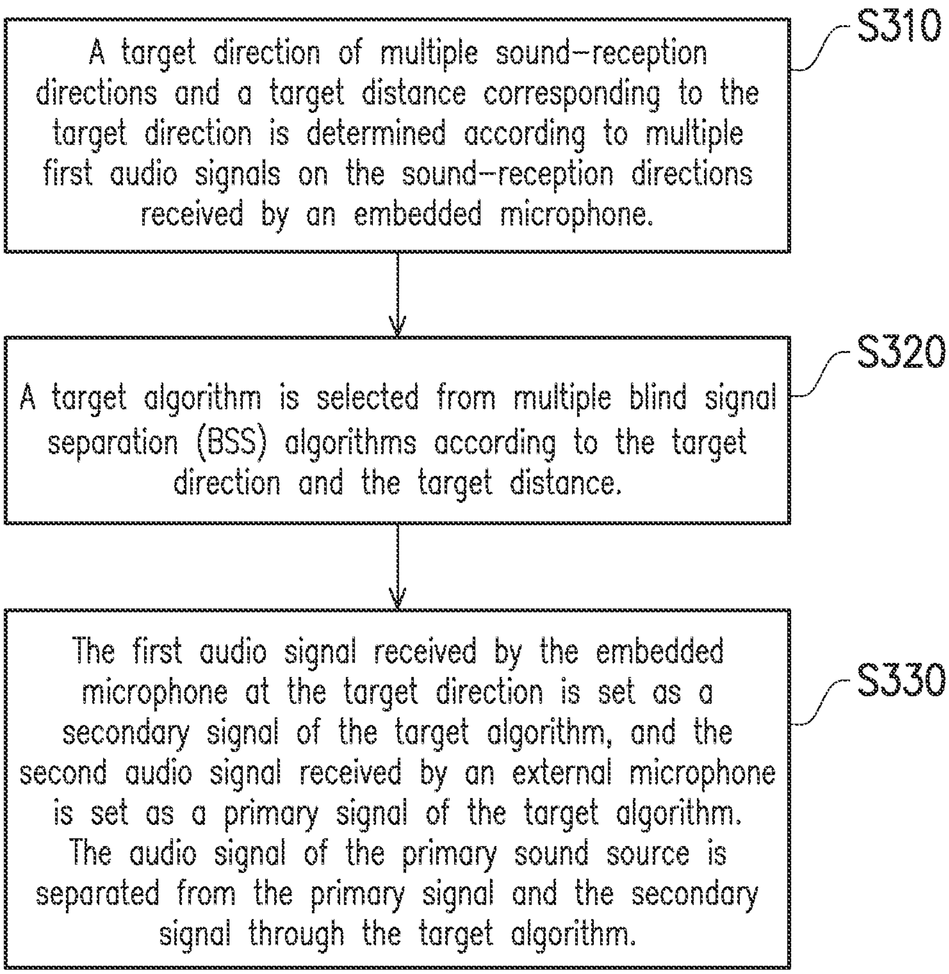
FIG. 3 is a flowchart of an audio signal processing method according to an embodiment of the disclosure.
Figure 4:
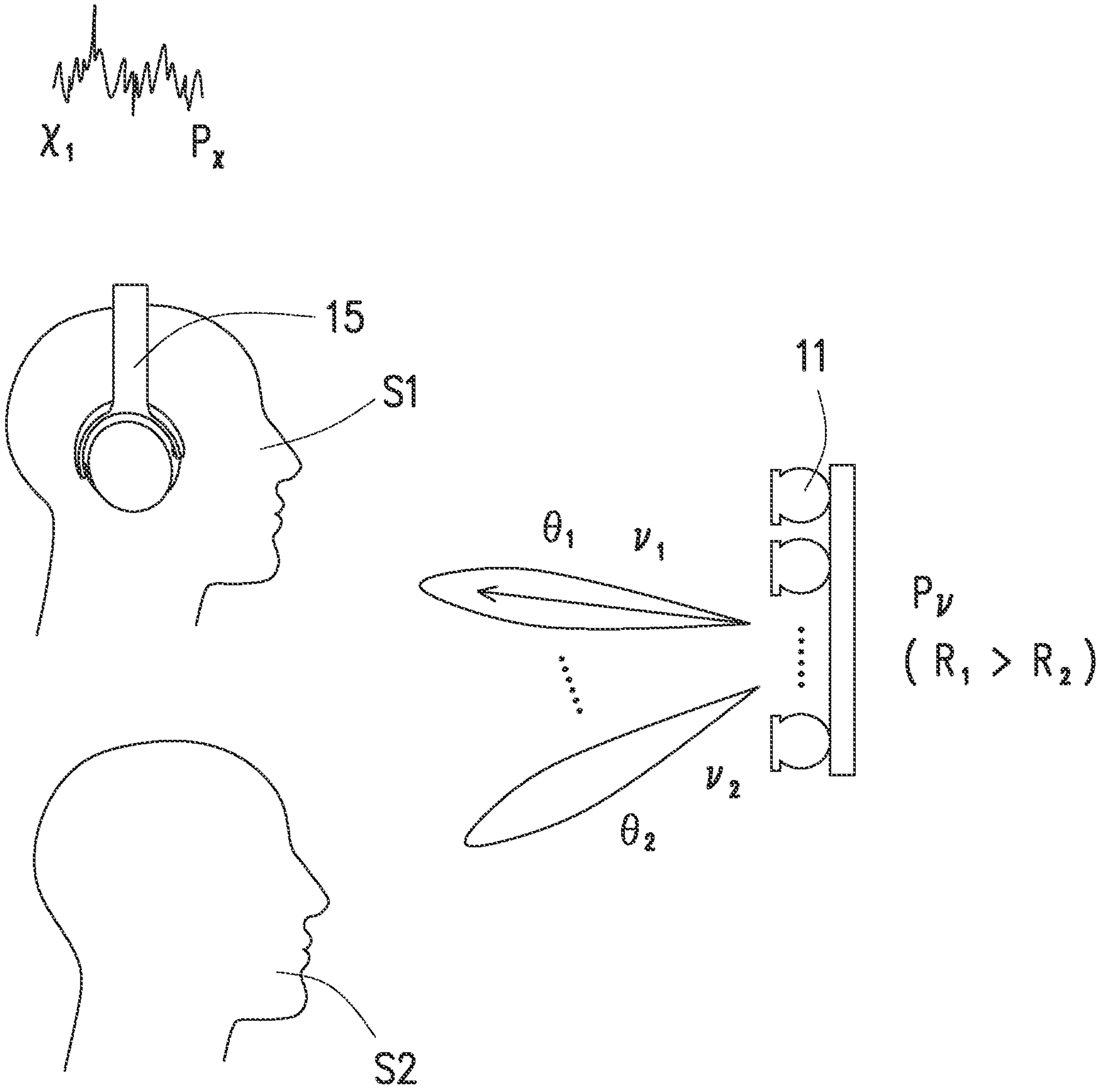
FIG. 4 is a schematic diagram of positioning a primary sound source according to an embodiment of the disclosure.

FIG. 3 is a flowchart of an audio signal processing method according to an embodiment of the disclosure. Referring to FIG. 3, the processor 14 determines a target direction of multiple sound-reception directions and a target distance corresponding to the target direction according to multiple first audio signals in the sound-reception directions received by the embedded microphone 11 (step S310). Specifically, the primary sound source is located in the target direction and at a target distance from the embedded microphone 11. The primary sound source can be people, other animals, machines, or speaker apparatuses. For example, FIG. 4 is a schematic diagram of positioning a primary sound source according to an embodiment of the disclosure. Referring to FIG. 4, it is assumed that the primary sound source is the user S1 of the mobile apparatus 10, and the user S1 wears/uses the external microphone 15. Another user S2 is not wearing/using the external microphone 15.

There are many ways to determine the sound-reception direction. In one embodiment, the processor 14 can form beams in multiple sound-reception directions (or directional angles) through the embedded microphone 11, such as the beams in the sound-reception directions θ1 and θ2 as shown in FIG. 4. The embedded microphone 11 can form beams according to beamforming technology. Beamforming can adjust the parameters (e.g., phase and amplitude) of the basic units of the phased array, so that signals at certain angles obtain constructive interference, while signals at other angles obtain destructive interference. Therefore, different parameters form different beam patterns, and the sound-reception direction of the primary beam may be different. The processor 14 can predefine or generate multiple sound-reception directions based on user input operations. For example, every interval of 10° between −90° and 90° serves as a sound-reception direction.

In one embodiment, the target direction is determined based on the correlation between the first audio signals and the second audio signal received by the external microphone 15. For example, the processor 14 respectively calculates an orthogonal cross-correlation for each of the first audio signals and the second audio signal. If the correlation between a certain first audio signal and the second audio signal is the largest, the processor 14 sets the sound-reception direction corresponding to this first audio signal as the target direction.

Taking FIG. 4 as an example, the processor 14 selects one of the first audio signals as the initial evaluation signal according to the initial direction, the sequence, or a random selection. For example, the first audio signal $v_1$ in the sound-reception direction θ1 is the evaluation signal. The processor 14 can compare a first correlation $R_1$ between the candidate signals among those first audio signals and the second audio signal $X_1$ with a second correlation $R_2$ between the evaluation signal among those first audio signals (take the first audio signal $v_2$ in the sound-reception direction θ2 as an example) and the second audio signal $X_1$. In response to the fact that the first correlation $R_1$ is greater than the second correlation $R_2$, the processor 14 may maintain the candidate signal as the candidate for the target direction and continue to compare other first audio signals. Until the comparison of all the first audio signals is completed, the processor 14 may use the sound-reception direction corresponding to the last candidate signal as the target direction.

On the other hand, in response to the fact that the first correlation $R_1$ is not greater than the second correlation $R_2$, the processor 14 may use the evaluation signal as a candidate signal to be a (new) candidate for the target direction. In this way, the first audio signal with the greatest correlation can be found, and its sound-reception direction is used as the target direction.

It should be noted that, if there are more than two greatest correlations, the processor 14 may determine the target direction between the sound-reception directions corresponding to these correlations according to a difference method.

In another embodiment, the direction of the primary sound source relative to the mobile apparatus 10 may be estimated based on the angle of arrival (AOA, or degree of arrival, DOA) positioning technology. For example, the processor 14 can determine the direction based on the time difference between two sound waves of audio signals from the primary sound source respectively arriving at the two embedded microphones 11 and the distance between the two embedded microphones 11, and thereby the direction is set as the target direction.

On the other hand, the target distance is determined based on the signal power of the first audio signal in the target direction. If the signal power is stronger, the target distance is closer; if the signal power is lower, the target distance is farther. For example, the signal power is inversely proportional to the square of the target distance, but may still be affected by factors such as the environment and receiver sensitivity.

Taking FIG. 4 as an example, assuming that the processor 14 knows the distance between the primary sound source and the external microphone 15, the signal power $P_x$ of the second audio signal can be used as a reference signal. The processor 14 can determine the target distance according to the ratio between the signal power $P_x$ and the signal power $P_v$ of the first audio signal (taking the first audio signal $v_1$ as an example) corresponding to the target direction (taking the sound-reception direction θ1 as an example), as well as the corresponding relationship (e.g., path loss, signal attenuation, etc.) between signal power and distance.

For another example, the corresponding relationship between signal power and distance has been defined in a comparison table or conversion formula and can be loaded into the processor 14 to estimate the target distance.

Referring to FIG. 3, the processor 14 selects a target algorithm from multiple blind signal separation (BSS) algorithms according to the target direction and the target distance (step S320). Specifically, in practical application scenarios, it is often encountered that multiple sound sources appear at the same time. "Blind" refers to the mixed signal formed by receiving audio signals from multiple sound sources, and one of the goals of the blind signal separation algorithm includes separating the audio signal of the primary sound source when there is only a mixed signal.

The blind signal separation algorithm includes an independent component analysis (ICA) algorithm and a sparse component analysis (SCA) algorithm.

The independent component analysis assumes that each sound source is independent of each other, and the audio signals of these sound sources do not affect the nature of the audio signal after being mixed, so the inverse transfer function matrix obtained by estimation (i.e., the separation matrix) is multiplied by the mixed signal to obtain the separated audio signal.

Figure 5:
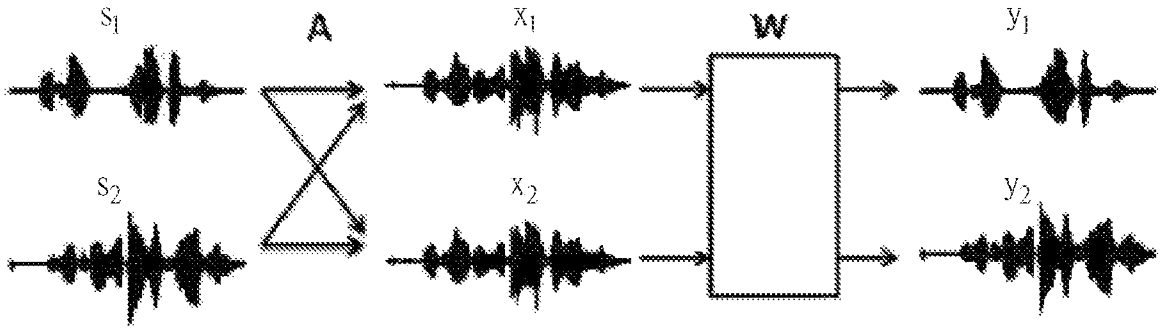
FIG. 5 is a schematic diagram illustrating blind signal separation according to an embodiment of the disclosure.

For example, FIG. 5 is a schematic diagram illustrating blind signal separation according to an embodiment of the disclosure. Referring to FIG. 5, the audio signals s1 and s2 of the two sound sources go through the spatial transfer function matrix A to obtain the mixed signals $x_1$ and $x_2$ (assuming that the mixed signal $x_1$ is the primary signal and the mixed signal $x_2$ is the secondary signal). It is assumed that the second audio signal received by the external microphone 15 is the mixed signal $x_1$, and the first audio signal received by the embedded microphone 11 is the mixed signal $x_2$. The blind signal separation algorithm separates the audio signals y1 and y2 of the two sound sources through the inverse transfer function matrix W. For example, the audio signal y1 is close to the audio signal s1, and the audio signal y2 is close to the audio signal s2.

The sparse component analysis assumes that the audio signal of the sound source is very sparse in some domains. "Sparse" means that most of the values of the audio signal are close to 0, that is, each component point in the mixed signal usually has only one primary sound source. For example, a voicegram (or referred to as a spectrogram) can be viewed as the change of voice frequency components over time, and voice signals from different people have different sound characteristics (e.g., fundamental frequency, double frequency, speech tempo, or pauses), so that the intersection of voicegrams of different sound sources is very small (or disjointed). Therefore, each time-frequency domain unit in the voicegram of the mixed signal coming from only one of the sound sources is known as a sparse characteristic.

The target algorithm is determined based on an included angle between the target direction and the interference source sound direction and the magnitude of the target distance, and the interference source sound direction corresponds to an interference sound source.

According to the Gaussian distribution characteristics of the voice (i.e., the first audio signal and the second audio signal approach Gaussian distribution), the voice signal is initially separated by the independent component analysis, and the specified objective function defined in the calculation process (i.e., the target algorithm) changes according to the target direction and target distance of the primary sound source relative to the mobile apparatus 10.

Negentropy is a non-Gaussian measurement method. In information theory, the entropy of a random variable is related to information. Negentropy can be defined as:

$$J(y) = H(y_{gauss}) - H(y), \tag{1}$$

where $y_{gauss}$ is a random variable conforming to the Gaussian distribution, y is a random variable corresponding to the primary signal and the secondary signal, and $$H(y) = -\int p_y(\tau)\log\{p_y(\tau)\}d\tau. \tag{2}$$

$p_y(\tau)$ is the probability density function of the random variable y. Function (1) can be approximated as:

$$J(y) \approx [E\{G(y)\} - E\{G(y_{gauss})\}]^2, \tag{3}$$

where E{ } is the expected function, and the parameter G can be selected from the parameters $G_1$, $G_2$ and $G_3$:

$$G_1(y) = \frac{1}{a_1}\log(\cosh a_1 y), \tag{4}$$

$$G_2(y) = -\exp\left(-\frac{y^2}{2}\right), \tag{5}$$

$$G_3(y) = y^4. \tag{6}$$

$a_1$ is a constant.

In one embodiment, the processor 14 can compare the target distance with a distance threshold (e.g., 10 cm, 15 cm or 30 cm). In response to the target distance being not less than the distance threshold, the processor 14 sets the target algorithm as the first independent component analysis algorithm using the parameter $G_1$. That is, the processor 14 selects the first independent component analysis algorithm using the parameter $G_1$ as the target algorithm. Since the user usually does not get too close to the mobile apparatus 10 in general use, the parameter $G_1$ is usually adopted. In response to the target distance being less than the distance threshold, the processor 14 sets the target algorithm as the second independent component analysis algorithm using the parameter $G_2$. That is, the processor 14 selects the second independent component analysis algorithm using the parameter $G_2$ as the target algorithm to obtain better stability.

In one embodiment, the processor 14 can determine the software and hardware resources of the mobile apparatus 10 and the load of the corresponding computation. In response to the computational limit (e.g., the access speed or bandwidth of the storage device 13 or the processing speed of the processor 14), the processor 14 sets the target algorithm as the third independent component analysis algorithm using the parameter $G_3$. That is, the processor 14 selects the third independent component analysis algorithm using the parameter $G_3$ as the target algorithm, so as to meet the requirement of a small computation.

In addition, according to individual voice characteristics, sparse component analysis can be used to separate the voice signal more completely. In the embodiment of the disclosure, the target algorithm of the primary sound source is changed relative to the target direction and target distance of the mobile apparatus 10.

Figure 6A:
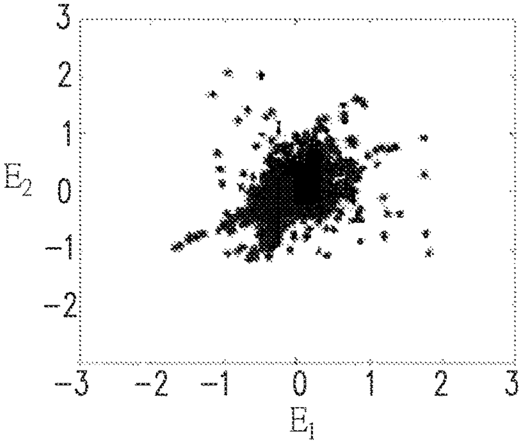
FIG. 6A to FIG. 6D are schematic diagrams of sparse component analysis according to an embodiment of the disclosure.
Figure 6B:
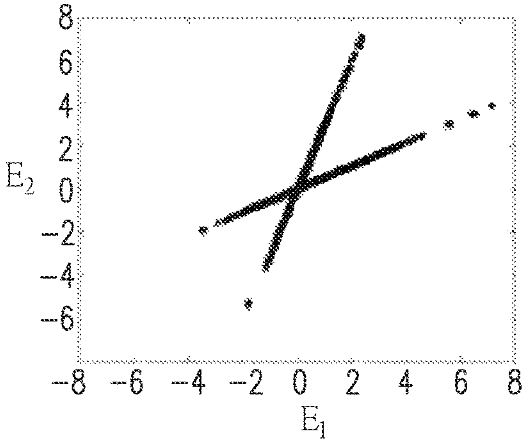

For example, FIG. 6A to FIG. 6D are schematic diagrams of sparse component analysis according to an embodiment of the disclosure. Referring to FIG. 6A, FIG. 6A is the scatter diagram (time-frequency domain signals $E_1$ and $E_2$ respectively corresponding to the mixed signals $x_1$ and $x_2$) of the edge of the voicegram of the mixed signal (e.g., the first audio signal or the second audio signal), and it is difficult to distinguish audio signals from different sound sources. Referring to FIG. 6B, the mixed signals $x_1$ and $x_2$ are projected into sparse signals, so that two non-correlated signals can be distinguished.

Figure 6C:
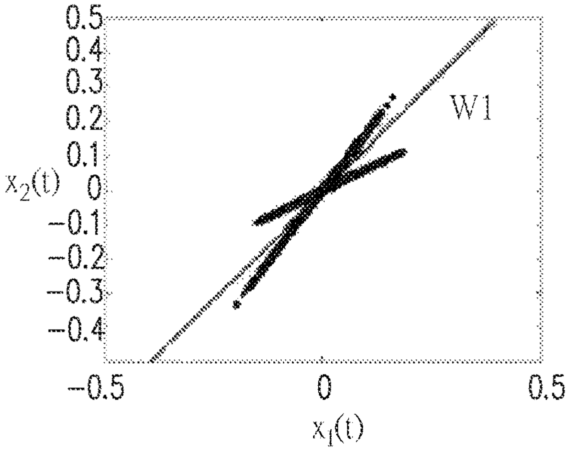
Figure 6D:
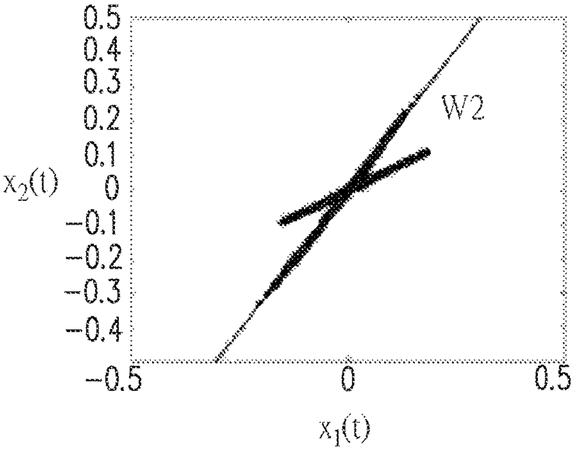

In order to project the mixed signals $x_1$ and $x_2$ into a sparse domain, the processor 14 can find its primary two directions (e.g., the target direction and the interference source sound direction). Referring to FIG. 6C (t is time), the principal component analysis (PCA) algorithm is to find the direction vector W1 that maximizes the expected value, thereby the target direction and the interference source sound direction is estimated. Referring to FIG. 6D, the nonlinear projection column masking (NPCM) algorithm is to find the direction vector W2 whose projection amount is greater than the corresponding threshold, thereby the target direction and the interference source sound direction is estimated.

In one embodiment, if the included angle between the target direction and the interference source sound direction is larger, the target direction and the interference source sound direction estimated by the nonlinear projection column masking algorithm may deviate from the actual direction. The processor 14 can compare the included angle between the target direction and the interference source sound direction with an angle threshold (e.g., 45 degrees, 60 degrees or 90 degrees). In response to the fact that the included angle between the target direction and the interference source sound direction is larger than the angle threshold, the processor 14 sets the target algorithm as a principal component analysis algorithm. That is, the processor 14 selects to use the principal component analysis algorithm as the target algorithm. In response to the fact that the included angle between the target direction and the interference source sound direction is not greater than the angle threshold, the processor 14 sets the target algorithm as a nonlinear projection column masking algorithm. That is, the processor 14 selects to use the nonlinear projection column masking algorithm as the target algorithm.

Referring to FIG. 3, the processor 14 sets the first audio signal received by the embedded microphone 11 at the target direction as a secondary signal of the target algorithm, and the second audio signal received by an external microphone 15 as a primary signal of the target algorithm. The audio signal of the primary sound source is separated from the primary signal and the secondary signal through the target algorithm (step S330). Specifically, since the external microphone 15 is usually closer to the primary sound source, the primary signal may have a higher proportion/component of the audio signal of the primary sound source. In contrast, the secondary signal may have a lower proportion/component of the audio signal of the primary sound source. Thus, the blind signal separation may, for example, give higher priority to primary signals and lower priority to secondary signals. For the introduction of the blind signal separation algorithm, refer to the description of step S320, and details are not repeated herein. Finally, the processor 14 can only transmit the audio signal of the primary sound source on the sound-reception path of the microphone, thereby enhancing the audio signal of the primary sound source.

To sum up, in the audio signal processing method and the mobile apparatus according to the embodiments of the disclosure, when an external microphone is used, the audio signal received by the external microphone is used as the primary signal. At the same time, the embedded microphone of the mobile apparatus is turned on, and the audio signal of the embedded microphone is used as the secondary signal. According to the direction and distance of the primary sound source relative to the mobile apparatus, and using the suitable blind signal separation technology, only the single audio signal of the primary sound source is transmitted on the microphone path, thereby strengthening the audio signal of the primary sound source.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. An audio signal processing method, suitable for a mobile apparatus and an external microphone (mic), the mobile apparatus communicatively connecting to the external microphone, the mobile apparatus comprising an embedded microphone (mic), the audio signal processing method comprising:

determining a target direction in a plurality of sound-reception directions and a target distance corresponding to the target direction according to a plurality of first audio signals in the sound-reception directions received by the embedded microphone, wherein a primary sound source is located in the target direction and at the target distance from the embedded microphone, the target direction is determined based on a correlation between the first audio signals and a second audio signal received by the external microphone, and the target distance is determined based on signal power of a first audio signal in the target direction;

selecting a target algorithm from a plurality of blind signal separation (BSS) algorithms according to the target direction and the target distance, wherein the target algorithm is determined based on an included angle between the target direction and an interference source sound direction and a magnitude of the target distance, and the interference source sound direction corresponds to an interference sound source; and setting the first audio signal received by the embedded microphone at the target direction as a secondary signal of the target algorithm, setting the second audio signal received by the external microphone as a primary signal of the target algorithm, and separating an audio signal of the primary sound source from the primary signal and the secondary signal through the target algorithm.

2. The audio signal processing method according to claim 1, wherein determining the target direction in the sound-reception directions and the target distance corresponding to the target direction comprises:

comparing a first correlation between a candidate signal among the first audio signals and the second audio signal with a second correlation between an evaluation signal among the first audio signals and the second audio signal, to determine the target direction.

3. The audio signal processing method according to claim 2, further comprising:

in response to the first correlation being greater than the second correlation, maintaining the candidate signal as a candidate for the target direction; and in response to the second correlation being greater than the first correlation, taking the evaluation signal as the candidate signal to be the candidate for the target direction.

4. The audio signal processing method according to claim 1, wherein selecting the target algorithm comprises:

in response to the target distance not being less than a distance threshold, the target algorithm being a first independent component analysis (ICA) algorithm using a parameter $G_1$, wherein $$G_1(y) = \frac{1}{a_1}\log(\cosh a_1 y),$$

y is a random variable corresponding to the primary signal and the secondary signal, and $a_1$ is a constant.

5. The audio signal processing method according to claim 1, wherein selecting the target algorithm comprises:

in response to the target distance being less than a distance threshold, the target algorithm being a second independent component analysis algorithm using a parameter $G_2$, wherein $$G_2(y) = -\exp\left(-\frac{y^2}{2}\right).$$

6. The audio signal processing method according to claim 1, wherein selecting the target algorithm comprises:

in response to a computational limit, the target algorithm being a third independent component analysis algorithm using a parameter $G_3$, wherein $G_3(y)=y^4$, y is a random variable corresponding to the primary signal and the secondary signal.

7. The audio signal processing method according to claim 1, wherein selecting the target algorithm comprises:

in response to the included angle between the target direction and the interference source sound direction being greater than an angle threshold, the target algorithm being a principal component analysis (PCA) algorithm.

8. The audio signal processing method according to claim 1, wherein selecting the target algorithm comprises:

in response to the included angle between the target direction and the interference source sound direction not being greater than an angle threshold, the target algorithm being a nonlinear projection column masking (NPCM) algorithm.

9. A mobile apparatus, comprising:

an embedded microphone, used for sound reception;

a communication transceiver, communicatively connected to an external microphone and used to receive signals from the external microphone; and a processor, coupled to the embedded microphone and the communication transceiver, and configured to perform:

determining a target direction in a plurality of sound-reception directions and a target distance corresponding to the target direction according to a plurality of first audio signals in the sound-reception directions received by the embedded microphone, wherein a primary sound source is located in the target direction and at the target distance from the embedded microphone, the target direction is determined based on a correlation between the first audio signals and a second audio signal received by the external microphone, and the target distance is determined based on signal power of a first audio signal in the target direction;

selecting a target algorithm from a plurality of blind signal separation (BSS) algorithms according to the target direction and the target distance, wherein the target algorithm is determined based on an included angle between the target direction and an interference source sound direction and a magnitude of the target distance, and the interference source sound direction corresponds to an interference sound source; and setting the first audio signal received by the embedded microphone at the target direction as a secondary signal of the target algorithm, setting the second audio signal received by the external microphone as a primary signal of the target algorithm, and separating an audio signal of the primary sound source from the primary signal and the secondary signal through the target algorithm.

10. The mobile apparatus according to claim 9, wherein the processor is further used to:

compare a first correlation between a candidate signal among the first audio signals and the second audio signal with a second correlation between an evaluation signal among the first audio signals and the second audio signal;

in response to the first correlation being greater than the second correlation, maintain the candidate signal as a candidate for the target direction; and in response to the second correlation being greater than the first correlation, take the evaluation signal as the candidate signal to be the candidate for the target direction.

11. The mobile apparatus according to claim 9, wherein the processor is further used to:

in response to the target distance not being less than a distance threshold, set the target algorithm as a first independent component analysis algorithm using a parameter $G_1$, wherein $$G_1(y) = \frac{1}{a_1}\log(\cosh a_1 y),$$

y is a random variable corresponding to the primary signal and the secondary signal, and $a_1$ is a constant.

12. The mobile apparatus according to claim 9, wherein the processor is further used to:

in response to the target distance being less than a distance threshold, set the target algorithm as a second independent component analysis algorithm using a parameter $G_2$, wherein $$G_2(y) = -\exp\left(-\frac{y^2}{2}\right).$$

13. The mobile apparatus according to claim 9, wherein the processor is further used to:

in response to a computational limit, set the target algorithm as a third independent component analysis algorithm using a parameter $G_3$, wherein $G_3(y)=y^4$, y is a random variable corresponding to the primary signal and the secondary signal.

14. The mobile apparatus according to claim 9, wherein the processor is further used to:

in response to the included angle between the target direction and the interference source sound direction being greater than an angle threshold, set the target algorithm as a principal component analysis algorithm.

15. The mobile apparatus according to claim 9, wherein the processor is further used to:

in response to the included angle between the target direction and the interference source sound direction not being greater than an angle threshold, set the target algorithm as a nonlinear projection column masking algorithm.

* * * * *